Figure 1:
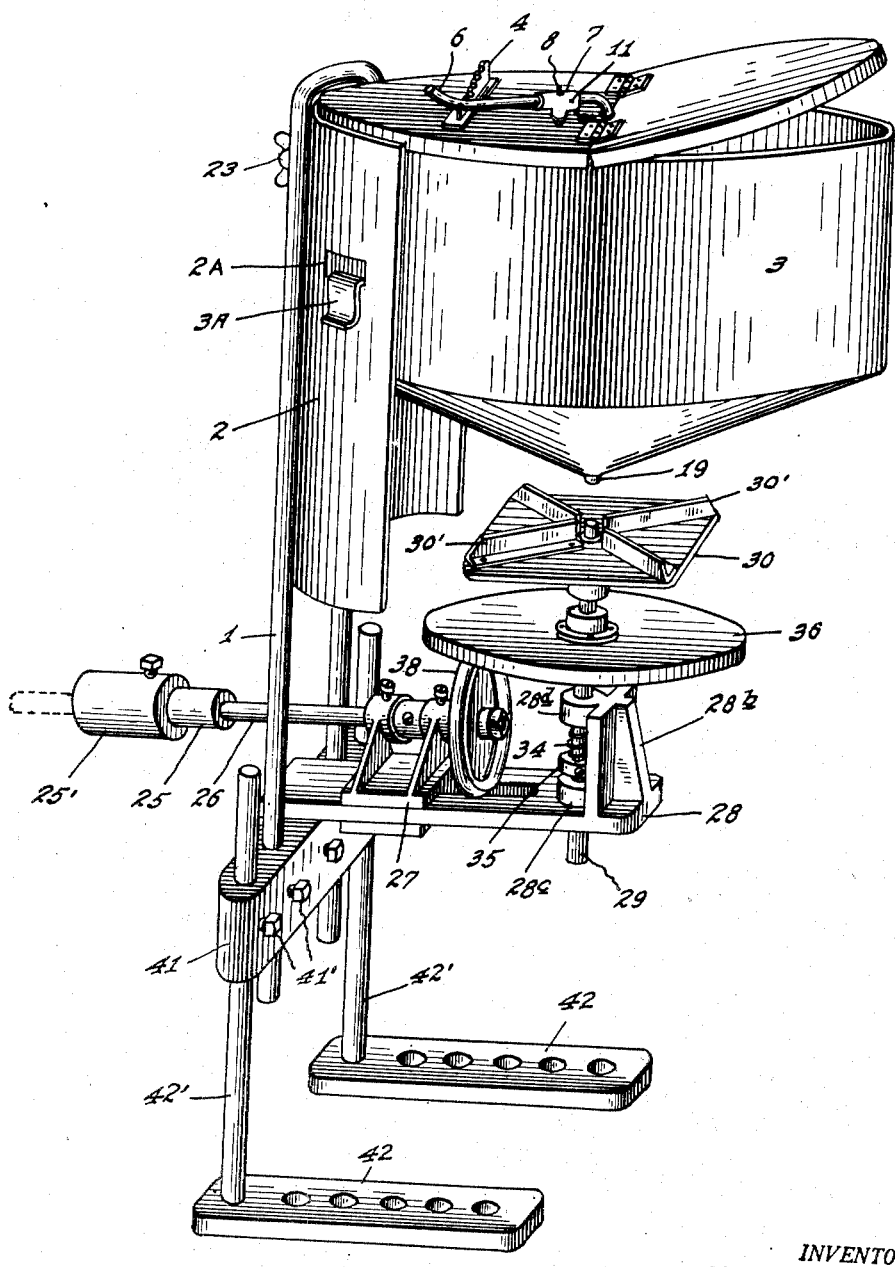

Sept. 15, 1953 J. L. PRESLER 2,652,261
MACHINE FOR PLANTING GRASS AND CLOVER SEED
Filed April 20, 1948 3 Sheets-Sheet 1

INVENTOR.
JAMES LAWRENCE PRESLER,
BY
ATTORNEYS.

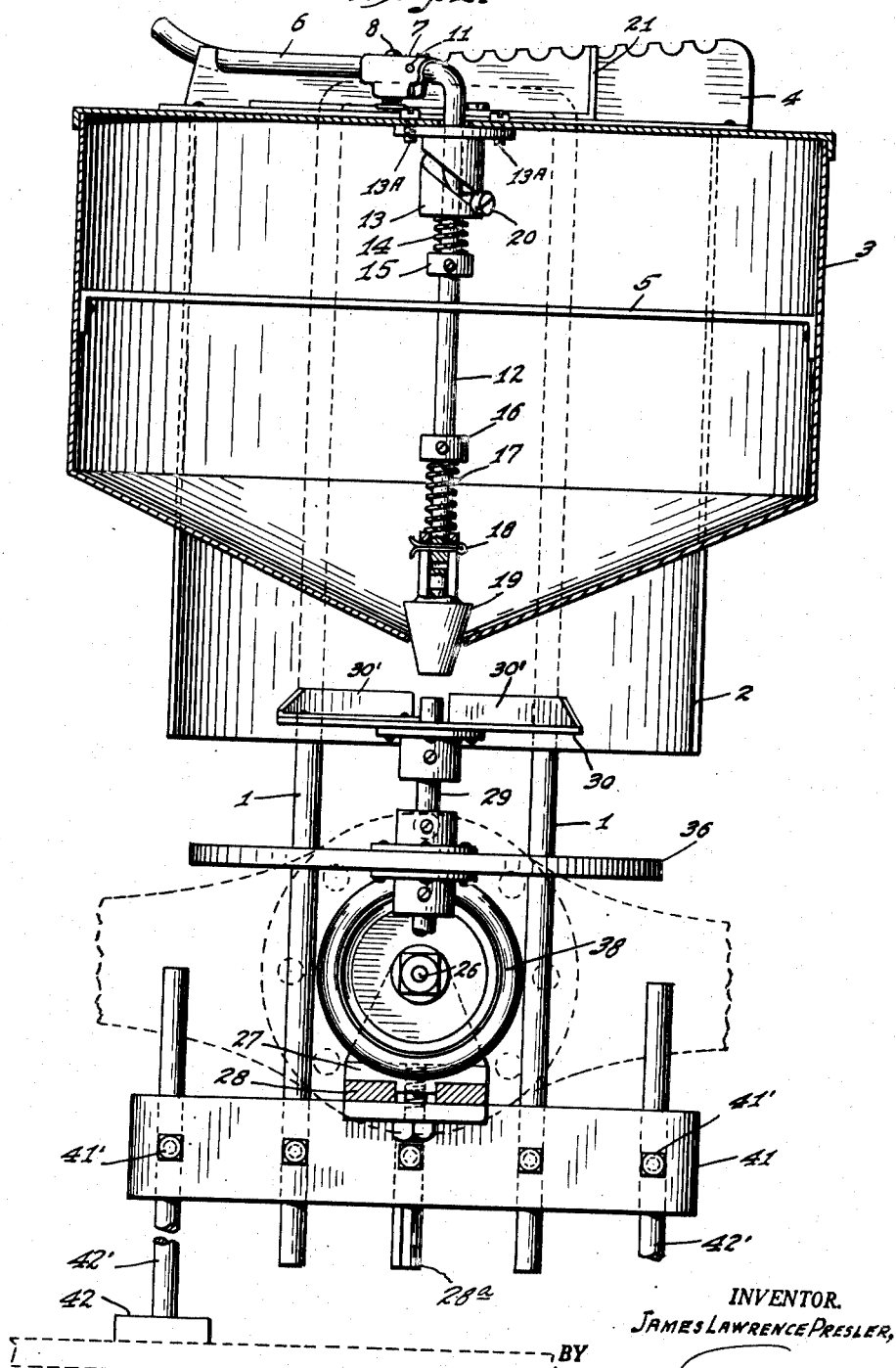

Sept. 15, 1953  J. L. PRESLER  2,652,261
MACHINE FOR PLANTING GRASS AND CLOVER SEED
Filed April 20, 1948  3 Sheets-Sheet 3
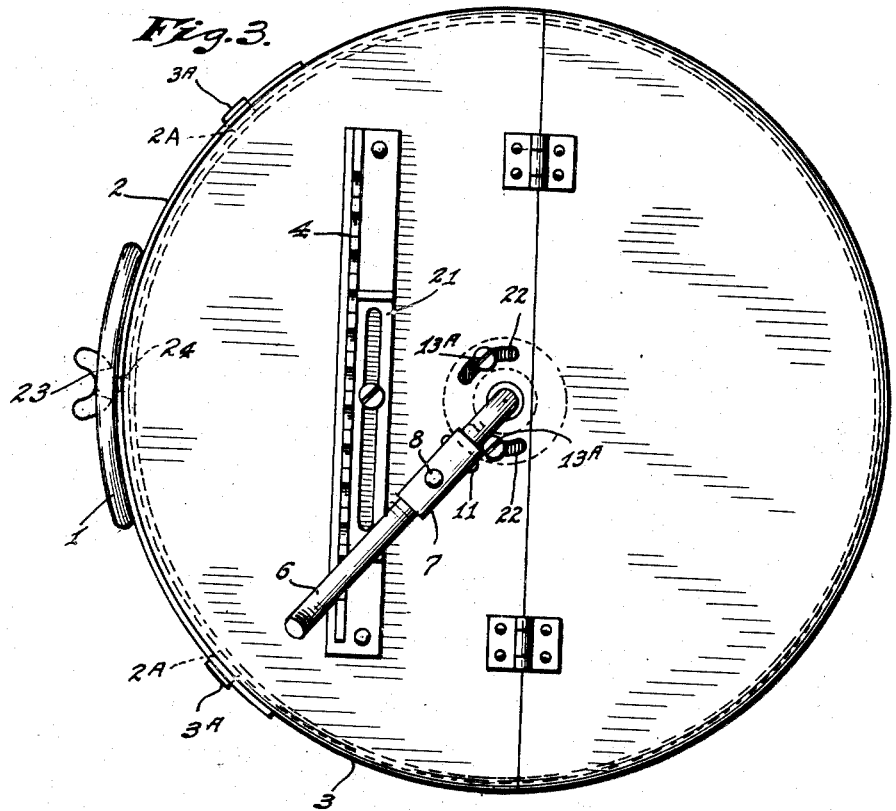
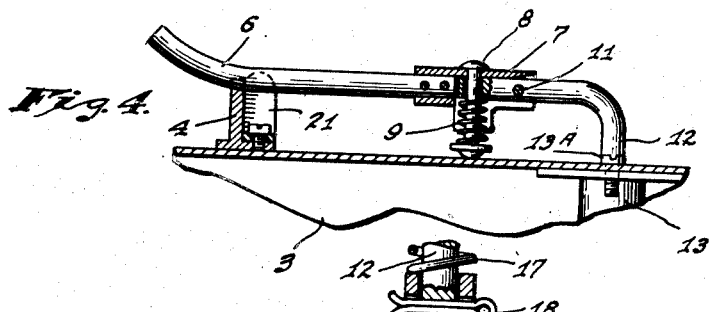
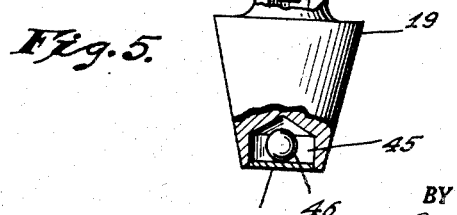
INVENTOR.
JAMES LAWRENCE PRESLER,
BY
ATTORNEYS.

Patented Sept. 15, 1953

2,652,261

UNITED STATES PATENT OFFICE 2,652,261

MACHINE FOR PLANTING GRASS AND CLOVER SEED

James Lawrence Presler, Van Wert County, Ohio

Application April 20, 1948, Serial No. 22,127

5 Claims. (Cl. 275—8)

This invention relates to seeders for sowing grass, clover, and other seeds and more particularly to a seeder adapted to be mounted upon and driven from a tractor. It is an object of the invention to provide a seeder with an adjustable mounting means which is adapted to support the seeder from any of a wide variety of tractors and in position to be driven by the power take-off of the tractor upon which it is mounted. Another object of the invention is to provide improved variable-speed drive by means of which the distributing mechanism of the seeder can be operated at the proper speed irrespective of the speed at which the power take-off of the tractor is operating. A further object of the invention is to provide in the mechanism controlling the rate of seed-flowing to seed-distributing mechanism an improved valve which will operate to prevent clogging and interruption of the seed-feed.

A seeder embodying my invention comprises an elevated seed-hopper through an outlet opening in the bottom of which seed flows to a distributor rotating about a vertical axis. The distributor is driven through a friction drive embodying a disk rigid with the distributor and a friction wheel which rotates about and is adjustable along a horizontal axis radial of the disk. The seed hopper is mounted upon a support which is vertically slidable in a base. Also vertically adjustable relative to the base are a pair of supports each having a vertical shank slidably received in the base and a horizontally extending foot provided with a series of holes to receive a bolt attaching it to a drawer or other convenient part of a tractor. The distributor and its friction drive are mounted on a table which is also provided with a vertical shank slidably received in the base so that it can be maintained at the desired distance below the hopper. The table carries a bearing which rotatively receives a horizontal shaft carrying the friction wheel and which is adjustable radially of the distributor to vary the point at which it engages the aforesaid disk. The friction-wheel shaft is adapted for connection to the power take-off of the tractor, desirably through some flexible torque-transmitting means such as heavy rubber hose. Above the distributor, the hopper is provided in its bottom with an outlet opening controlled by a vertically adjustable, conical valve loosely connected to its associated adjusting mechanism so that it can vibrate freely in a horizontal plane as the tractor upon which the seeder is mounted proceeds over the ground.

The accompanying drawings illustrate the invention: Fig. 1 is a perspective view illustrating a complete attachment; Fig. 2 is a rear elevational view illustrating the hopper in vertical section; Fig. 3 is a top plan view; Fig. 4 is a fragmental vertical section illustrating details of the valve adjustment mechanism; and Fig. 5 is a fragmental view of the valve and its mounting with portions broken away the better to illustrate the construction.

The device shown in the drawing embodies a hopper-support 1 conveniently in the form of a metal bar bent into a general U-shape and disposed with its legs vertical. To the upper end of the support 1 there is secured in any convenient manner an apron 2 which in turn supports a hopper 3 having a conical bottom sloping to a central outlet opening. The body of the hopper 3 is conveniently cylindrical, and the apron 2 is curved to fit against the hopper. For the purpose of removably supporting the hopper 3 from the apron 2, the hopper may be provided with curved fingers 3A adapted to be received respectively in slots 2A provided in the apron 2.

Upon the cover of the hopper 3 I provide a bracket 4 having an inclined series of notches in any of which there may be received an arm 6 mounted on the upper end and extending radially from a vertical shaft 12 disposed centrally of the hopper and supported therein from the cover and a cross member 5. Above the cover (Fig. 4), the upper end of the shaft 12 is bent to extend horizontally for pivotal connection on a horizontal axis to a fitting 7 to which the arm 6 is secured. A rivet 8 passes upwardly through a compression spring 9, and the bent end of the shaft 12, and the upper wall of the fitting 7, being headed above the latter; and the fitting is pivotally connected to the bent end of the shaft 12 by a horizontal pin or rivet 11. The spring 9 bears upwardly against the bent end of the shaft 12 and downwardly against the rivet 8, so that it urges the arm 6 downwardly and resiliently holds it seated in contact with the bracket 4.

Near the lower end of the shaft 12 (Fig. 2) there is secured thereto a collar 16, and below such collar there is a compression spring 17 which bears upwardly against the collar and downwardly against a conical valve member 19 loosely and slidably mounted on the lower end of the shaft. (See also Fig. 5.) A cotter pin or transverse member 18 extending through a hole in the shaft 12 and also through a vertical slot in the valve member 19 limits movement of the valve member under the influence of spring 17.

The shaft 12 is supported from the hopper cover through the medium of a bearing 13 secured to the hopper cover and provided in its wall with a helical slot through which there extends a pin 20 rigidly mounted in the shaft 12. A spring 14 surrounding the shaft 12 below the bearing 13 acts downwardly on a collar 15 secured to the shaft 12. The spring 14 serves to take up lost motion or play in the shaft-positioning mechanism.

From the foregoing, it will be apparent that the rate at which seed is fed through the outlet opening in the bottom of the hopper will be controlled by the position of the arm 6 along the bracket 4. If the arm 6 is moved along the bracket to rotate the shaft 12 in the counterclockwise direction, the pin 20, traversing the helical slot in the bearing 13, will cause the shaft 12 to move downward until the valve 19 engages the opening in the hopper-bottom. Further movement of the arm 6 in the same direction will lower the shaft 12 and compress the spring 17, thus resiliently forcing the valve 19 against its seat and insuring against the escape of seed. If the arm 6 is moved in the opposite direction, the cooperation of the pin 20 with the helical slot in the bearing 13 causes the shaft 12 to move vertically. As the cotter pin 18 reaches the upper end of the slot in the valve member 19 in the upward movement of the shaft 12, the valve 19 opens to permit the escape of seed from the hopper, the rate of seed-escape being controlled by the vertical position of the valve.

If desired, there may be associated with the bracket 4 a sliding stop member 21 which can be positioned at any desired point along the bracket to be engaged by the arm 6 and thus limit opening movement of the valve 19. The adjustable stop 21 permits the user of the seeder to close the valve at any time and later to open it exactly to its original setting.

If desired, the bearing 13 may be mounted for limited angular adjustment about the axis of the shaft 12. To this end, the hopper-cover may be provided with arcuate slots 22 which receive screws 13A that pass through the cover and into the bearing to secure the latter in position. By adjusting the bearing 13 about the axis of the shaft 12, the position of the valve 19 corresponding to any position of the arm 6 may be varied within limits.

While the curved fingers 3A cooperating with the slots 2A in the apron 2 serve adequately to support the weight of the hopper and its contents, it may be advisable to provide an additional means for anchoring the hopper in position on the apron. If so, a screw 23 passing through a slot 24 in the apron and into a suitable screwthreaded opening associated with the hopper may be employed.

Mounted below the hopper 3 in position to receive the seed fed therefrom under control of the valve 19 is a distributor disk or plate 30 secured to the upper end of a vertical shaft 29. On its upper face, the plate 30 is provided with radially extending ribs 30'. The shaft 29 is rotatively supported on a vertical axis from a table 28 provided at one end with an upwardly extending arm 28b carrying spaced bearings 28c and 28d which rotatively receive the shaft 29. Secured to the shaft 29 above the upper bearing 28d and below the distributor plate 30 is a friction disk 36 adapted to engage a friction wheel 38 secured to one end of a horizontal shaft 26. The shaft 26 is supported in fixed axial position relative to a bearing block 27 slidable on the table 28 radially of the shaft 29 in order to vary the distance between the axis of the shaft 29 and the point at which the friction disk 36 engages the friction wheel 38. At the end opposite the friction wheel 38, the shaft 26 has secured to it a coupling member 25 adapted to be driven by the tractor conveniently through a short length of rubber hose 25' secured to the coupling member 25 and to the power take-off shaft of the tractor. The coupling member 25 is keyed to the shaft 26 to rotate therewith but to slide thereon when the bracket 27 is moved to adjust the position of the wheel 38.

The shaft 29 is vertically slidable as well as rotatable in the bearings 28c and 28d; and intermediate such bearings it is provided with a collar 35 between which and the upper bearing 28d there acts a compression spring 34 urging the shaft 29 downwardly to hold the friction disk 36 in firm frictional engagement with the wheel 38.

The parallel legs of the hopper-support 1 are slidably received in two vertical openings in a base 41. Additional openings in the base 41 receive the shanks 42' of supports 42. Each support 42 has a horizontally extending foot provided with a series of openings any of which is adapted to receive a bolt attaching the associated support 42 to the drawbar or other convenient part of a tractor. The table 28 is provided with a downwardly extending shank 28a which is slidably received in an opening in the base 41. Set screws 41' mounted in the base cooperate with the shanks 28a, 42' and the legs of the hopper-support 1 to hold such shanks and legs in the desired position of adjustment. The shanks 42' of the supports 42 are desirably rotatable as well as slidable in the base-openings which receive them, thus making possible a variation in the distance between the openings in the feet of the two supports. Desirably, the shank 28a is flattened or grooved for the receipt of its associated set screw to provide against any rotation of the table 28 relative to the base 41, thus insuring the proper condition of the alignment between the distributor 30 and the hopper 3.

The loose mounting of the valve 19 on the lower end of the shaft 12 permits such valve, when opened, to vibrate horizontally in the outlet opening of the hopper as the tractor carrying the seeder moves over the ground. This movement of the valve, which always remains within the hopper-outlet, dislodges any seed which might otherwise become lodged in such outlet, and thus insures a continuity of feed as long as the valve is open and the hopper contains any seed. While the valve is thus constantly moving horizontally, the effective size of the feed opening does not vary and the rate of seed-feed therefore remains constant. The tendency of the valve to vibrate horizontally as the tractor moves may be increased by providing the valve with a downwardly opening recess 45 (Fig. 5) which loosely receives a heavy ball 46 capable of rolling back and forth on a recess-closure 47. The impact of the ball on the sides of the recess prevents the valve from becoming lodged in fixed position in the outlet opening of the hopper.

I have found that accurate control of the speed of the distributor 30 is essential to an even distribution of seed. In seeders which I have built, a drop in the speed of the distributor 30 below 550 revolutions per minute causes the seed to be concentrated near the center of the strip of seeds deposited as the tractor progresses over the ground. On the other hand, if the speed of the distributor rises above 600 revolutions per minute, the seed tends to become concentrated near the edges of the strip. The speed adjustment provided by the variable-ratio friction drive enables me to maintain a desirable speed of rotation of the distributor 30 irrespective of the speed at which the tractor progresses over the ground and irrespective of the speed-ratio of the tractor driving mechanism.

The mechanism disclosed for mounting the seeder on the tractor is extremely flexible and adapts the seeder for attachment in suitable position on tractors of a wide variety of construction. The feet of the supports 42 can be held against either upwardly or downwardly presented surfaces on the tractor, and the supports can be disposed either with their shanks extending upwardly or downwardly from the feet. Possibility of swinging each support about the axis of its shank makes possible an infinitely fine variation in the distance between the holes which receive the bolts securing the feet to the tractor. In addition to the range of vertical adjustment provided by sliding movement of the base 41 on the shanks of the supports, a further range of vertical adjustment is provided by the slidability of the hopper-support 1 and the table-shank 28a in the base.

I claim as my invention:

1. In a seeder for mounting on a tractor having a power take-off, a frame structure adapted for attachment to the tractor, a hopper on said frame structure having an outlet opening at its bottom, a vertical shaft, means carried by said frame for rotatably supporting said shaft in a position below the hopper, a distributor on and rotatable with the shaft, a friction disk secured to said shaft below the distributor, a horizontal shaft extending radially of and forwardly from the vertical shaft, means rotatably supporting said shafts from said frame structure, a friction wheel on the rear end of said horizontal shaft and engaging said disk, said wheel being adjustable radially of said disk, means for retaining said wheel in any position of adjustment radially of said disk and means for releasably connecting the forward end of the horizontal shaft to the power take-off of the tractor.

2. The invention set forth in claim 1 with the addition that said shaft-supporting means includes a bearing in which said horizontal shaft is rotatable but axially fixed, and a support for said bearing, said bearing being adjustable on said support along a line parallel to the horizontal shaft.

3. In a seeder for mounting on a tractor having a power take-off, a frame structure adapted for attachment to the tractor, a hopper on said frame structure having an outlet opening at its bottom, a distributor mounted on said frame structure for scattering seed fed from said outlet opening, mechanism connectible to the power take-off of the tractor for driving said distributor, said supporting structure comprising a base, a hopper-support connected to said base for vertical adjustment, means for supporting said driving mechanism from the base, said means being connected to the base for vertical adjustment relative thereto, and a pair of base-supports for connecting said base to the tractor, each of said base-supports being rotatably and vertically adjustable in said base and having a laterally projecting foot provided with one or more bolt-holes and adapted to overlap a tractor drawbar and to be secured thereto by a bolt passing through one of said bolt-holes.

4. In a seeder for mounting on a tractor having a power take-off, a frame structure adapted for attachment to the tractor, a hopper on said frame structure having an outlet opening at its bottom, a distributor mounted on said frame structure for scattering seed fed from said outlet opening, mechanism connectible to the power take-off of the tractor for driving said distributor, said supporting structure comprising a base, a hopper-support connected to said base, means for supporting said driving mechanism from the base, and a pair of base-supports for connecting said base to the tractor, each of said base-supports being rotatably and vertically adjustable in said base and having a laterally projecting foot provided with one or more bolt-holes and adapted to overlap a tractor drawbar and to be secured thereto by a bolt passing through one of said bolt-holes.

5. The invention set forth in claim 4 with the addition that each of said base-supports has a vertically extending cylindrical shank, said base having vertical holes extending through it for the reception of the respective shanks, each shank being both rotatable and slidable in its associated hole, and means for clamping each shank in fixed position relative to the base.

JAMES LAWRENCE PRESLER.

References Cited in the file of this patent

UNITED STATES PATENTS

| Number | Name | Date |
|---|---|---|
| 557,010 | Morse | Mar. 24, 1896 |
| 683,545 | Baker | Oct. 1, 1901 |
| 883,564 | Parrish | Mar. 31, 1908 |
| 964,243 | Griswold | July 12, 1910 |
| 1,263,105 | Plummer | Apr. 16, 1918 |
| 1,322,559 | Gethman | Nov. 25, 1919 |
| 1,508,210 | Bangert | Sept. 9, 1924 |
| 1,625,353 | Dugan | Apr. 19, 1927 |
| 1,682,735 | Bergerioux | Sept. 4, 1928 |
| 1,727,056 | Gebhart | Sept. 3, 1929 |
| 1,751,928 | Lachner | Mar. 25, 1930 |
| 1,971,432 | Smith | Aug. 28, 1934 |
| 2,169,779 | Loewe | Aug. 15, 1939 |
| 2,187,448 | Currivan et al. | Jan. 16, 1940 |
| 2,192,802 | Pound | Mar. 5, 1940 |
| 2,198,389 | Graham | Apr. 23, 1940 |
| 2,293,977 | Hoffstetter | Aug. 25, 1942 |
| 2,334,376 | Bauer | Nov. 16, 1943 |
| 2,519,243 | Gjertson | Aug. 15, 1950 |

FOREIGN PATENTS

| Number | Country | Date |
|---|---|---|
| 82,555 | Sweden | Feb. 12, 1935 |